US005745738A

United States Patent [19]
Ricard

[11] Patent Number: 5,745,738
[45] Date of Patent: Apr. 28, 1998

[54] METHOD AND ENGINE FOR AUTOMATING THE CREATION OF SIMULATIONS FOR DEMONSTRATING USE OF SOFTWARE

[75] Inventor: Douglas Alan Ricard, Bellevue, Wash.

[73] Assignee: Microsoft Corporation, Redmond, Wash.

[21] Appl. No.: 654,924

[22] Filed: May 29, 1996

[51] Int. Cl.$^6$ .................................................. G06F 9/455
[52] U.S. Cl. ........................ 395/500; 395/385; 395/952; 434/118
[58] Field of Search .................... 395/500, 800, 395/333, 385; 340/747; 434/317, 118; 358/342; 439/81; 386/83; 364/200 MS File, 900 MS File

[56] References Cited

U.S. PATENT DOCUMENTS

| | | | |
|---|---|---|---|
| 4,700,181 | 10/1987 | Maine et al. | 340/747 |
| 4,706,212 | 11/1987 | Toma | 364/900 |
| 4,827,404 | 5/1989 | Barstow et al. | 364/200 |
| 5,174,759 | 12/1992 | Preston et al. | 434/317 |
| 5,247,651 | 9/1993 | Clarisse | 395/500 |
| 5,434,678 | 7/1995 | Abecassis | 358/342 |
| 5,513,991 | 5/1996 | Reynolds et al. | 439/81 |
| 5,517,663 | 5/1996 | Kahn | 395/800 |
| 5,589,945 | 12/1996 | Abecassis | 386/83 |
| 5,596,695 | 1/1997 | Hamada et al. | 395/333 |

OTHER PUBLICATIONS

"Impact of Communication Delays and Deadline Times on Distributed Processing in Packet Radio Networks", by R. Doyle et al., IEEE, MILCOM '92, 1992, pp. 0750–0756.
"REALISM: Reusable Elements for Animation using Local Integrated Simulation Models", by I. Palmer et al., IEEE, Computer Animation, 1994 Proceedings, Sep. 1994, pp. 132–140.
"A Knowledge–Based Approach to Encourage Reuse of Simulation and Modeling Programs", by L. Miller and A. Quilici, IEEE, Software Engineering and Knowledge Engineering, 1992 Conference. Aug. 1992, pp. 158–163.

*Primary Examiner*—Kevin J. Teska
*Assistant Examiner*—Russell W. Frejd
*Attorney, Agent, or Firm*—Ronald M. Anderson

[57] ABSTRACT

A simulation demonstrating or teaching a procedure used in a software program based on a script of commands that are executed by a script engine. The script engine interprets the commands using libraries of functions that interact with the software program and the operating system of the computer on which the script engine is executed. The commands are control actions implemented within the software to emulate the actions of an expert carrying out the procedure being simulated. For example, the commands cause a mouse cursor to select a specified item from a drop down menu list as if the cursor were being controlled by the expert in an appropriate display screen of the software program. A plurality of images are thus created showing the cursor in different positions as it moves on the display screen. Text is entered in response to the commands, causing images showing each letter (or phrase) being entered, as if by the expert. The images are converted into an animation that can be run from within the software program or as a stand alone demo. Author selected text and numeric tokens within the commands are added to a translation table and associated with text in a different language or other numeric values to create simulations in other languages. Modification of a simulation in response to changes in the software program or to correct errors is readily accomplished by editing the commands in the script and rerunning the creation of the images and animation file.

37 Claims, 8 Drawing Sheets

स,745,738

METHOD AND ENGINE FOR AUTOMATING THE CREATION OF SIMULATIONS FOR DEMONSTRATING USE OF SOFTWARE

FIELD OF THE INVENTION

The present invention relates to a method and engine for creating software simulations, and more particularly, to a method and engine for automating the creation of simulations for software applications.

BACKGROUND OF THE INVENTION

Simulations are produced in the software industry for product tutorials and marketing presentations. These simulations are useful for demonstrating a product and teaching how to use specific features in a product. Currently, software simulations are developed with labor intensive techniques. One production technique uses a video camera to film screen images produced as an experienced user physically steps through a software procedure. After filming the entire procedure, the video tape may be edited to add captions and/or a sound narrative. Because significant editing of a video tape is costly and time consuming, a procedure is usually re-filmed when an error must be corrected, or if a change in the software product prior to its initial release occurs that affects the procedure shown in the video. The edited video tape of the simulation is typically digitized into an animation format file that is distributed to prospective users of the product, or included with the software product to teach new users about and how to use the software product. When included with the software product, the animation is often accessed as a tutorial option under a Help menu topic. The animation file can be distributed alone or as part of a software product on various digital media such as floppy disks or CD-ROMs, and can be transmitted over networks, as is often done when used as part of a "demo" of a product.

Another common simulation production technique is to record all on-screen activity implemented to demonstrate features of a software product with a screen capture program such as Lotus ScreenCam. The author of a simulation launches a screen capture program that records the physical actions of an expert user, while stepping through a software procedure. The actions may include moving a mouse cursor to specific areas on the screen, selecting program options in dialog boxes and menus, and entering text on a keyboard. After recording the entire procedure in an animation format file, the simulation may be edited to add captions and sound. Significant editing of an animation format file is time consuming, and the procedure usually has to be recorded again when an error must be corrected, or if a change occurs in the software program prior to its distribution that affects the accuracy of the simulation.

A further simulation production technique is to create a separate software program that simulates a particular software product. In this case, the separate software program automatically steps through an entire procedure of the software product to be simulated. This separate software simulation program could be written in the language "C" or some other suitable high-level language. However, significant technical expertise is required to author a separate software simulation program, and changes to the program can only be made by a highly skilled computer programmer.

A significant problem in the creation of a tutorial simulation arises because a product tutorial is normally produced before development of a software product is concluded. As a product is undergoing development, significant changes to the screens, dialogs, menus, command structure, and user interface may occur just prior to the release date. During this developmental process, it may be necessary to recreate the tutorial simulation repeatedly to remain current with the latest version of the software product.

Another industry problem arises in connection with producing simulations for software products distributed in foreign countries. When software is sold internationally, simulations must be produced not only for English language customers, but for different foreign language customers as well. Previous methods require filming a separate tutorial in each foreign language such as German, French, Italian, and Spanish, in which the product will be marketed. Consequently, considerable costs are incurred when a simulation is produced that will be associated with a software product intended for international distribution. Thus, the software industry has a long-felt need for an inexpensive method to record simulations that enables the simulations to be easily modified and translated into foreign languages.

SUMMARY OF THE INVENTION

Products in the software industry are often developed with tools that automate labor intensive tasks. In particular, the demand for machine independent products that can be easily modified has encouraged the use of tools such as scripted authoring environments. The present invention is a system and method for automating the creation of software simulations with an author produced script that is used to automate the creation of a simulation within a scripted authoring environment. The method includes the step of creating a series of simple script commands in a text file. Once the script is complete, the author runs a simulation engine. The simulation engine automatically produces the scripted simulation as a plurality of images that are preferably stored in a device independent bitmap (DIB) format. In producing the images, the engine can also translate a first language text (e.g., in English) that is employed in the simulation into a second language text that is different than the first.

Once the simulation image data are saved, the author must convert the data into an animation format, such as Audio Video Interleaved (AVI). If errors are found in the simulation, the script file can readily be edited to correct the errors. The author then runs the simulation engine again to reproduce the edited simulation images for conversion into the animation format. This simple iterative method allows the author to easily edit and produce a simulation and to respond to changes in the program that require modification and editing of the simulation by simply editing the script text file. The need for video cameras, actors, and video editing equipment is eliminated, which greatly reduces the expense of producing a simulation.

The creation of a foreign language simulation is very efficiently implemented with the present invention. A translation table is created the first time the simulation engine is executed that contains specific strings and numeric values in a first language. These specific strings and numeric values are referenced in the script as a tokenizable item. Next, the translation table is edited to associate these tokenizable items with a second set of strings in a different language and/or with different numeric strings. Once the editing of the translation file is complete, the author executes the simulation engine again. As the engine re-executes, it exchanges the tokenizable item values with the associated second set of strings and numeric values in the translation table. The result is a new simulation with a different language text and/or other numeric values replacing the tokenizable item values. This process is repeated for each translation of the simulation into a different language.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
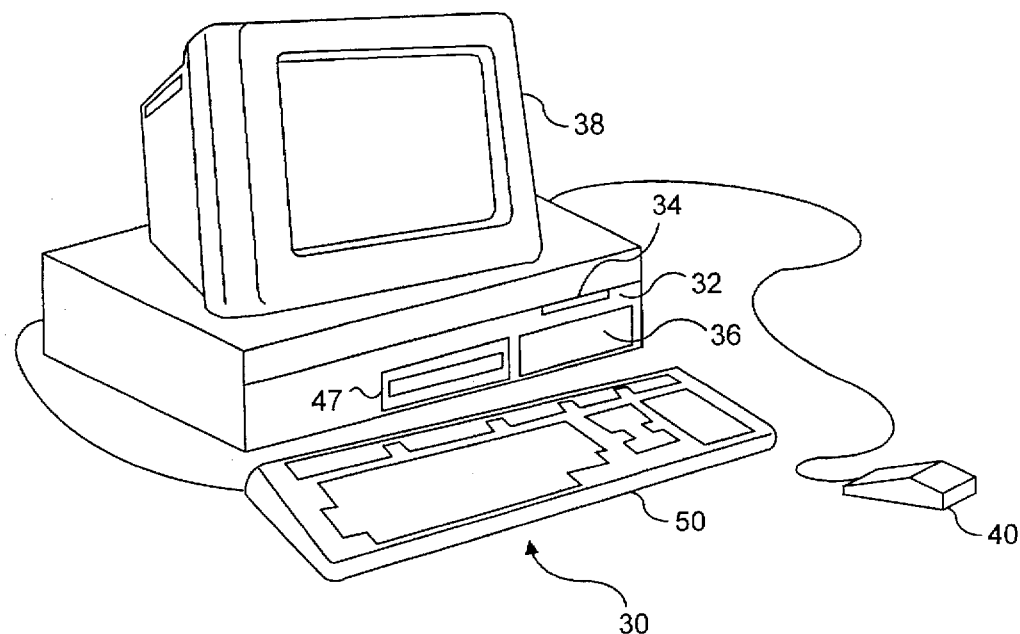
FIG. 1 is a schematic block diagram showing a personal computer and modem suitable for use in implementing the present invention.

The present invention is directed to an efficient method and system for automating the authoring of software simulations. An author (or simulation creator) produces a simulation by composing a script. The script is a text file that includes a series of commands. These commands are interpreted in a preferred embodiment of the invention to produce a plurality of images in the form of Device Independent Bitmaps (DIBs). The DIBs are preferably converted by a third party software program into an animation format file which is suitable for viewing when a user of the software program runs the simulation, e.g., by selecting a tutorial from the Help menu of the software program that demonstrates a procedure or by running a demonstration that illustrates the procedure being implemented by the software program. Since the simulation is produced based on the commands entered in the text file, the cost of producing and editing a simulation is significantly reduced compared to the approach used previously, as discussed above in the Background of the Invention.

The text commands entered for scripting a simulation can be thought of as an orchestration of events, actions, and behavior of objects within a software program, and are analogous to the stage directions and lines of a script for a theatrical play. The simulation script commands make reference to media objects that are part of the software program in which a procedure is being simulated and control the action of one or more of the media objects as programmed by the script author. The author composes a text file containing script commands that hide an operating system's low level implementation details and generate machine instructions that are readable by the software program and by the operating system and cause a plurality of the DIB images to be produced in sequence that illustrate the procedure in the software program, which is being simulated. The present invention uses Microsoft Corporation's Visual Basic environment as a parser/interpreter to support real time interactivity in developing a simulation.

The conversion of the images into an animation file produces a file in a form such as an Audio Visual Interleaved (AVI) format, which can be run by an appropriate player. The player file(s) may be provided with the operating system or included on a floppy disk or CD-ROM on which a demo of the software product is distributed.

The advantages in authoring simulations with a script of commands are: (1) the author only has to compose one script text file to produce a simulation that will work with different operating systems that support the Visual Basic Development system; (2) the parser/interpreter (or compiler) used in the development environment automatically performs the task of converting the script commands into software code suitable for execution on a particular operating system; and (3) the author can easily modify the simulation by editing the commands included in the script text file and thereby obviate the need to reproduce the entire simulation with an expert physically stepping through the software procedures. Another advantage of the present invention is that the author can easily create different versions of the simulation in different foreign languages by simply editing a translation table in which all of the text appearing in the simulation in one language is associated with the text that appears in another language version of the simulation. The translation process entails associating a tokenizable item (i.e., a word or phrase) of a first language text or numeric value with a corresponding second language text or numeric value. After editing, the second language text or numeric value will replace the associated tokenizable item in a new simulation when the script is again run. The flexibility and low cost of producing software simulations in any desired language with a script of text commands meets a long-felt need of the software industry.

With reference to FIG. 1, a personal computer 30 is illustrated as an example of the type of computer suitable for use in connection with creating a simulation in accord with the present invention. Although the personal computer illustrated uses a Microsoft Corporation operating system, such as Windows 95™, it is contemplated that other types of personal computers, such as those made by Apple Computer Corporation, will also be usable in implementing the present invention. Personal computer 30 includes a processor chassis 32 in which is mounted a floppy disk drive 34, which is suitable for reading and writing data from and to a floppy disk (not shown), and a hard drive 36 suitable for nonvolatile storage of data and executable programs. A monitor 38 is included for displaying graphics and text produced when an executable program is being run on the personal computer and for use in connection with the present invention, for displaying a simulation to a user.

Input can be provided to personal computer 30 using either a mouse 40 for manipulating a cursor (not shown) on monitor 38, which is used for selecting menu items and graphic controls displayed on the monitor by pressing an appropriate selection button (not shown) on the mouse, or by input entered by the user on a keyboard 50. Optionally, processor chassis 32 includes a CD-ROM drive 47, which is suitable for reading programs and data from a CD-ROM.

Figure 2:
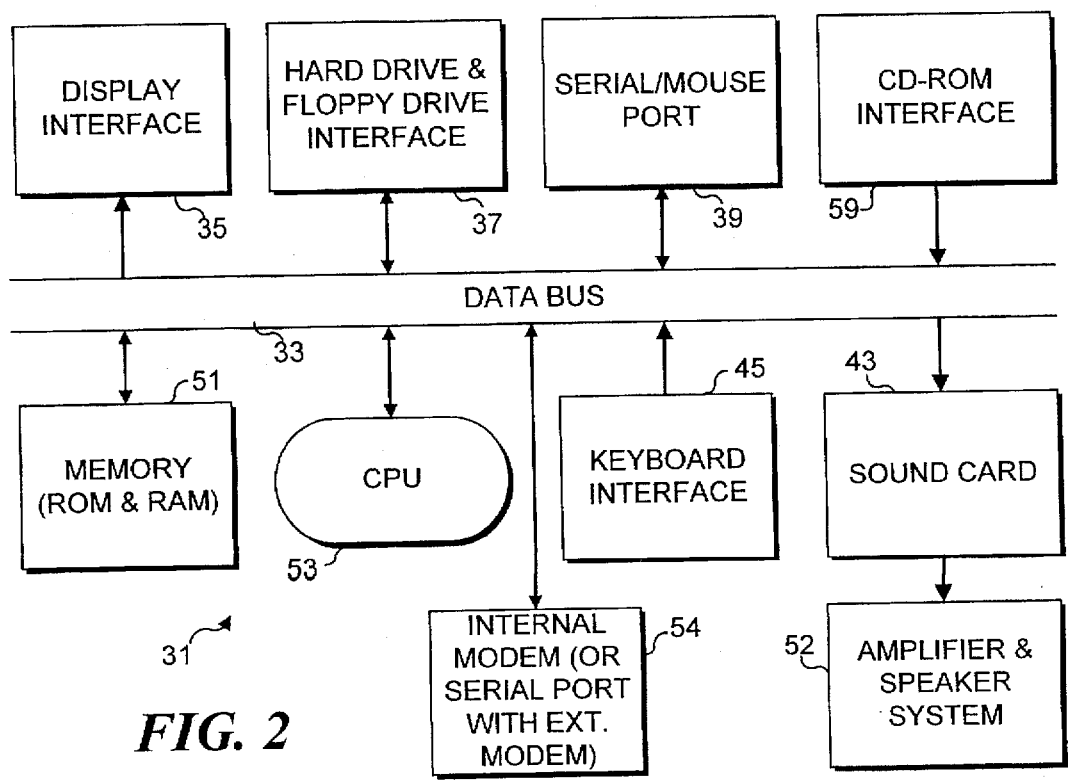
FIG. 2 is a block diagram illustrating components of the personal computer that are included within its processor chassis.

FIG. 2 shows a block diagram 31 in which components housed within processor chassis 32 are illustrated. A motherboard (not shown) includes a data bus 33, which provides bi-directional communication between these components and a central processing unit (CPU) 53. The components include a display interface 35, which drives monitor 38, providing the video signals necessary to produce a graphic display during the chat session and when running other executable programs running on the personal computer. A hard drive and floppy drive interface 37 provides bi-directional communication between floppy drive 34 and hard drive 36, and data bus 33, enabling data and machine instructions comprising executable programs to be stored and later read into a memory 51. Memory 51 includes both a read only memory (ROM) and random access memory (RAM). The ROM is used for storing a basic input/output operating system (BIOS) used in booting up personal computer 30 and other instructions essential for its operation. Machine instructions comprising executable programs are loaded into the RAM via data bus 33 to control CPU 53.

A serial/mouse port 39 provides an interface for mouse 40 to data bus 33 so that signals indicative of movement of the mouse and actuation of the buttons on the mouse are input to CPU 53. An optional CD-ROM interface 59 couples optional CD-ROM drive 47 to data bus 33 and may comprise a small computer system interface (SCSI) or other appropriate type of interface designed to respond to the signals output from CD-ROM drive 47. Optionally, a sound card 43 is connected to data bus 33 and its output is coupled to an amplifier and speaker system 52 to provide a sound capability for personal computer 30. Output signals from keyboard 50 are connected to a keyboard interface 45, which conveys the signals from the keyboard to data bus 33. If no external modem is used, an internal modem 54 can be coupled directly to data bus 33. Alternatively, an external modem (not shown) can be connected to the data bus through a serial port of personal computer 30.

The production of a software simulation with the present invention is a straightforward process. The author composes a script or text file of commands that will be followed to simulate the desired procedure in a software program. This text file can be created using a text line editor or a word processing program such as Microsoft Corporation's Word™, which is capable of storing a plain text file containing the commands on hard drive 36.

Figure 3:
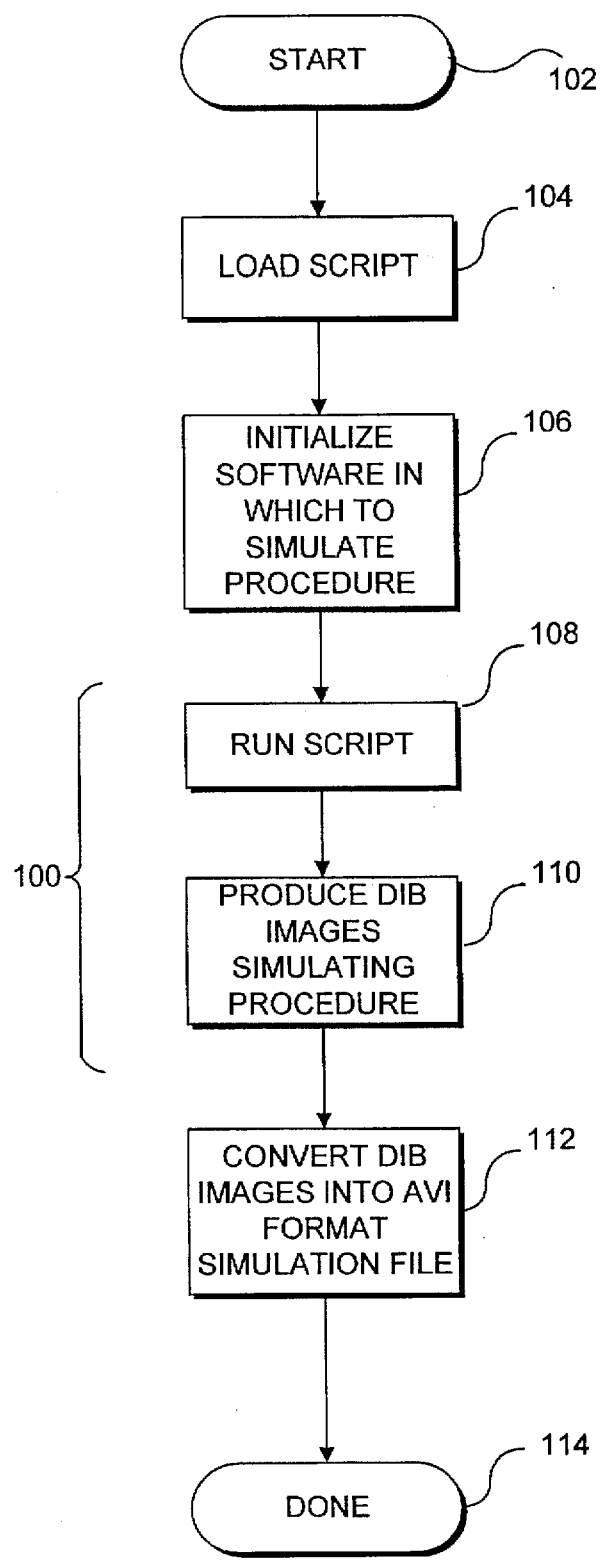
FIG. 3 is a flow chart that defines the logical steps implemented in producing a simulation.

Referring now to FIG. 3, details of the steps involved in producing a simulation are shown beginning with a start block 102. A block 104 calls for the author to execute Microsoft Corporation's Visual Basic™ Workplace on personal computer 30 and load the text file of script commands that were previously created. Next, in a block 106, the author executes (i.e., runs) the software program in which the simulated procedure defined by the commands is to be created. The logic proceeds to a block 108 in which a simulation engine 100 runs the text file by interpreting the script commands. Errors in syntax or logic that are detected by the interpreter can be corrected at this point.

In a block 1 10, the interpreted script commands call the operating system to produce DIB format images in which steps of the procedure being simulated are illustrated. The simulation engine has access to Visual Basic file libraries for producing simulations, and in the preferred embodiment, these libraries comprise mouse.bas, dialog.bas, menu.bas, snapshot.bas, token.bas, custom.bas, and misc.bas. The libraries contain functions and routines that facilitate producing the simulation images. Based upon the commands in the script and using the functions included in the libraries, the operating system and software program are manipulated to produce a sequence of DIB images. Each image depicts an incremental step in the procedure, including simulating the movement of the mouse cursor to different screen positions, selection of items in menus and dialogs, and the entry of text as if these steps were done by an expert using the software program to implement the procedure being taught or demonstrated by the simulation.

The DIB images are not easily viewed as an animation because the format is incompatible with most animation viewing programs. Subsequently, in a block 112, the DIB images are formatted into a standardized animation file format. Software programs such as Microsoft Corporation's AVI Edit™ can be used to format or convert the DIB images into an AVI file. The author of the simulation can then display the AVI file comprising the simulation using a software program such as Microsoft Corporation's Media Player. It is envisioned that alternative animation file formats may be desired for displaying the simulation. Examples of other animation file formats suitable for use with the present invention include: Amiga Animation (ANI), Apple Corporation's Quick Time™ (QTM), Autodesk Corporation' Animator™ (FLI) and Extended Animator™ (FLC), Intel Corporation's Digital Video™ (DVI), and the Motion Picture Expert Group (MPEG).

In a block 114, the simulation is ready for viewing and, after being checked for errors, for incorporation with the software program files that will subsequently be distributed to users who purchase a license in the software program or who request a demo showing feature(s) of the software program being implemented by the simulation. Users can access the simulation as a tutorial, typically through the Help menu of the software program. However, before the simulation is distributed, the author will normally first want to very carefully check the simulation for errors, which may have arisen due to errors in the script commands. After previewing the simulation, the author can re-edit the script text file to correct any problems with the displayed simulation and repeat the steps above to produce an updated and corrected simulation. Further iterations of these steps can be carried out until the author is satisfied with the simulation or to modify it in response to changes in the user interface, menus, dialog boxes, or operation of the software program, as often can occur during beta testing of a new software program.

Figure 4:
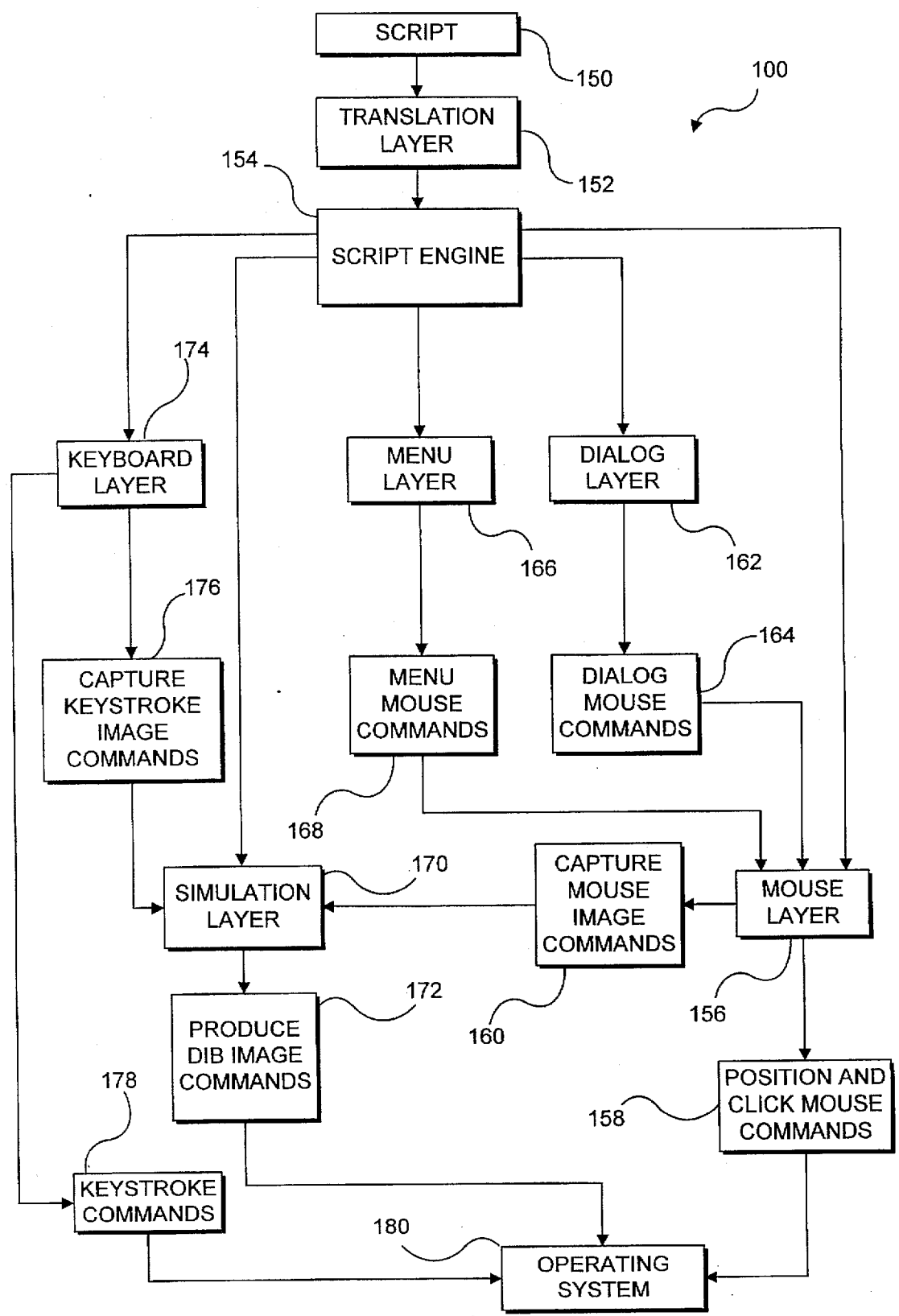
FIG. 4 is a flow chart that illustrates the module architecture of the simulation engine.

As shown in FIG. 4, the architecture of simulation engine 100 has several software modules or layers. Starting at a block 150, the script text file is loaded by the author into Microsoft Corporation's Visual Basic Workplace environment so that the simulation engine can begin to parse the script commands. Although not done when the script file is initially processed in a first language, hierarchically, a translation block 152 is provided to determine if any particular data types have been designated as a tokenizable item to be processed to produce a simulation in a different language from that in which the simulation was originally developed.

In the translation layer, the data types are not tokenized in a traditional sense. Instead, the tokenization step returns a specified character string or numeric value in response to the commands in the script. Each of the character strings/ numeric values returned will have previously been designated as a tokenizable item by the author; this process supports all data types. Depending upon the author's logical setting of specific switches when running the parser/ interpreter in Workplace, the translation layer will either: (1) export the tokenizable items into a new translation table and abort the simulation; (2) call the simulation engine to further interpret the script and ignore any designated tokenizable items; or (3) call the simulation engine to replace the tokenizable items with associated data types in the translation table, thereby producing a simulation in a different language. If the author elects to export the tokenizable items to the translation table, the translation table can be edited with a text editor to associate the tokenizable items with a word and/or phrases from a second language text or with a different numerical notation. Subsequently, when rerunning the script commands to produce the simulation, each time that a tokenizable item is encountered, the translation layer will refer to the translation table to determine the corresponding second language text or numerical notation that should be used instead of that for which the script commands were originally prepared.

Once the requirements of the translation layer have been satisfied, a logic block 154 processes the script with a script engine. The script engine passes the interpreted commands to five distinct modules or layers, namely, a mouse layer, a dialog layer, a menu layer, a simulation layer, and a keyboard layer. In a logic block 156, the mouse layer receives commands from the dialog layer, the menu layer, and directly from the script engine. These mouse commands relate to simulating mouse/cursor movement and controlling the simulated depression and release of buttons on the mouse (or other pointing device) to select menu items, manipulate dialog controls, and select ranges of data that are displayed in the software program. The mouse layer passes appropriate mouse commands through a block 158, to a logic block 180, which directs the operating system to animate the cursor by simulating actions by a user with the pointing device or mouse. The cursor position and click commands comprise moving the screen cursor, clicking a select button, and holding down a select button (or the other button) on the mouse or other pointing device. The mouse layer also passes capture mouse image commands, as indicated in a block 160 to a logic block 170, which uses the simulation layer to produce images in which successive positions of the cursor and buttons on a graphically portrayed mouse are illustrated relative to screen displays from the software program that are responsive to the actions of the simulated mouse/pointing device.

In a logic block 162, the dialog layer receives commands from the script engine to display dialog box(es) and select specific controls/options in the dialog box(es). The dialog layer passes dialog mouse commands 164 to the mouse layer for selecting controls in a displayed dialog box. The menu layer receives commands directly from the script engine and passes menu mouse commands 168 to the mouse layer to select and drag down menus with the cursor, again simulating the actions of an expert manipulating the mouse/pointing device to effect these functions. In a logic block 174, the keyboard layer receives commands from the script engine. The keyboard layer passes keystroke commands as provided in a block 178 directly to the operating system and also issues capture keystroke image commands, as indicated in a block 176, for output of the commands to the simulation layer. Thus, when a dialog box in the software program must be filled in with appropriate text that would normally be entered by a user on the keyboard, the keyboard layer implements the script commands to simulate the entry of this text and captures image(s) of the text being entered in the dialog box.

The simulation layer also receives capture image commands from the script engine to produce snapshot images of the display screen. The simulation layer processes the capture image commands and then passes the appropriate "produce DIB image commands" to the operating system, as noted in blocks 172 and 180.

Figure 5:
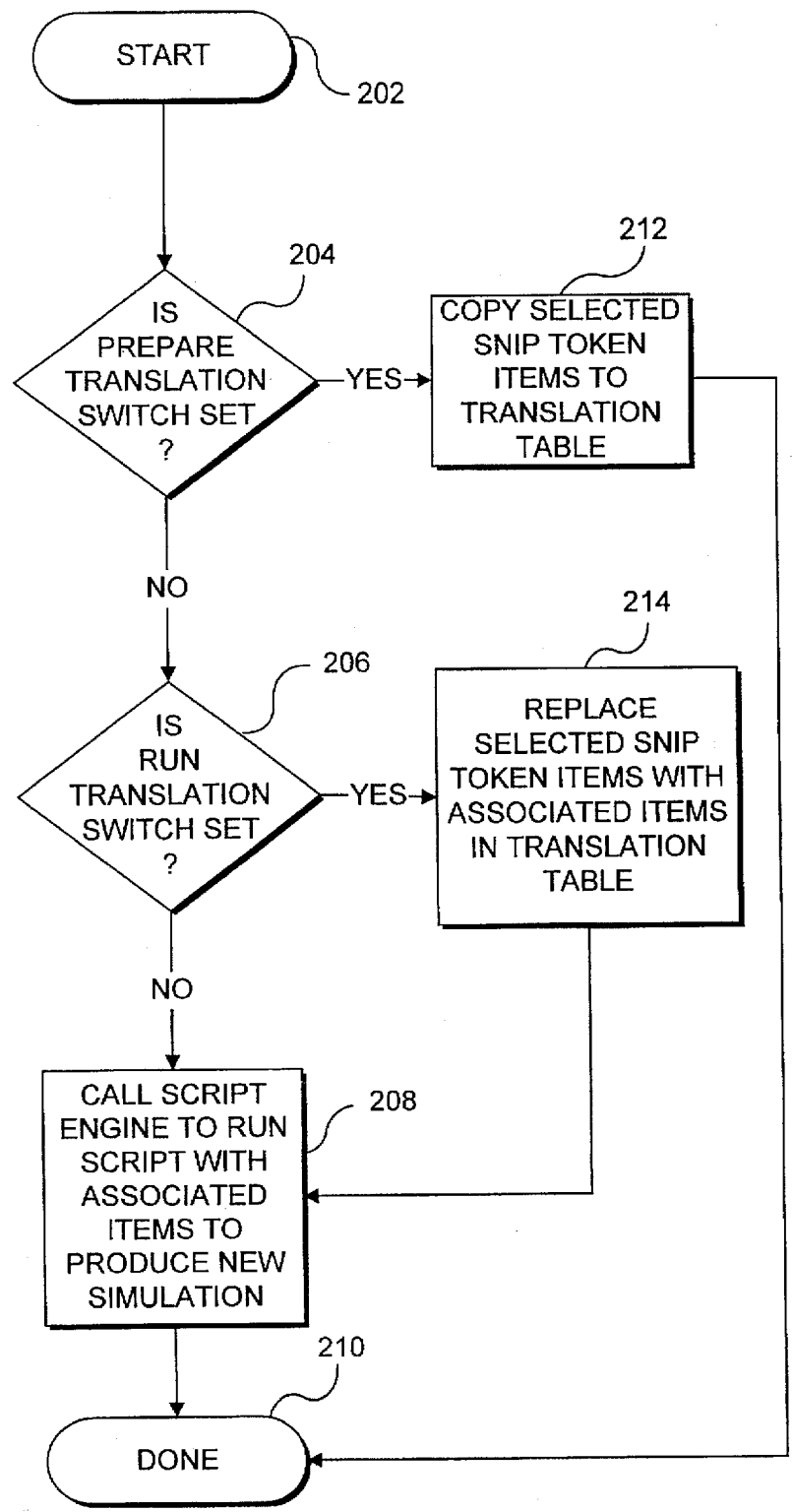
FIG. 5 is a flow chart that defines the logical steps implemented in replacing tokenizable items from the simulation with new character strings and numeric values.

Referring now to FIG. 5, the flow chart includes the logical steps for implementing the translation layer. Beginning with a start block 202, the author has logically loaded the script text file in Microsoft Corporation's Visual Basic WorkPlace. At the command line, the author sets software switches that determine the three options for processing the script commands through the translation layer. In a decision block 204, the translation layer determines if the "prepare translation switch" was set by the author. If this switch is set, then in a logic block 212, the translation layer checks the script text for selected tokenizable items (i.e., previously selected by the author) and copies the tokenizable items to a translation table. Once all of the commands in the script have been processed and the translation table is completed, the translation layer terminates the processing of the script and exits at a logic block 210 without creating a simulation. At this point, if the simulation is to be used with the software program distributed in a country where a different language is used in the software program menus, dialogs, and instructions, the author has the option to edit the translation table and associate new items with the tokenizable items. These new items in the translation table, which are in a different language, are later used to replace specific items in a new simulation that is created when different switches are selected at the command line and the script commands are run again.

If the prepare translation switch is not set, the translation layer program flow passes to a decision block 206. At this point, the translation layer determines if the "run translation switch" was set. If this switch is set, the translation layer in a logic block 214 replaces the selected tokenizable items in the script with the new items that were associated with the tokenizable items in the translation table. After the replacement, in a logic block 208, the translation layer calls the script engine to produce a new simulation with the new items. If the run translation switch is not set, the original tokenizable items are used to produce the simulation, i.e., none of the new items entered into the translation table are used and the simulation is created with the original tokenizable items or in the original language in which the script commands were prepared. The translation layer logic is complete after block 208 and control is passed to the script engine.

Figure 6:
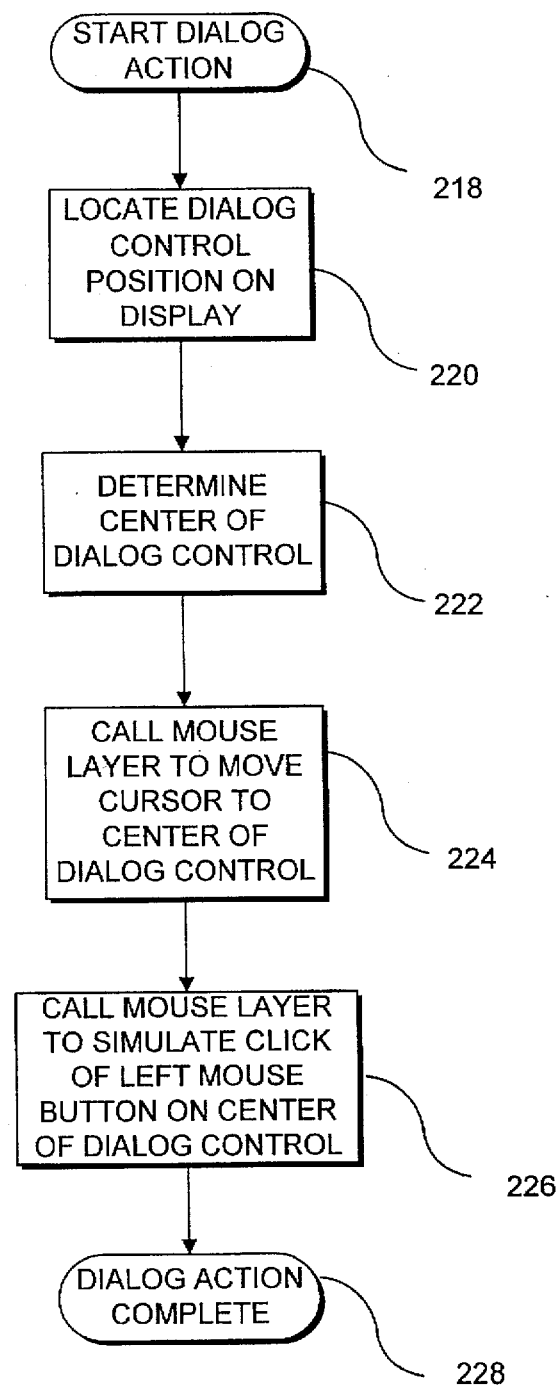
FIG. 6 is a flow chart that defines the logical steps implemented in simulating a dialog box action.

The script engine calls the dialog layer to display dialog box(es) and select controls in the dialog box(es). Referring to FIG. 6, a script dialog command is passed by the script engine to the dialog layer in a start block 218. In a logic block 220, the dialog layer locates a selected dialog control position on a display 220. Next, in a logic block 222, the dialog layer determines the center of the selected dialog control. The dialog layer calls the mouse layer in a logic block 224 causing the cursor to move to the center of the selected dialog control. Once the cursor is in position over the center of the dialog control, in a logic block 226, the dialog layer calls the mouse layer again to simulate a user clicking the left (i.e., the select) mouse button so that the dialog control is selected. After the button is clicked, the dialog layer advances to a logic block 228 and closes the dialog box. The dialog action is now complete and control passes back to the script engine.

Figure 7:
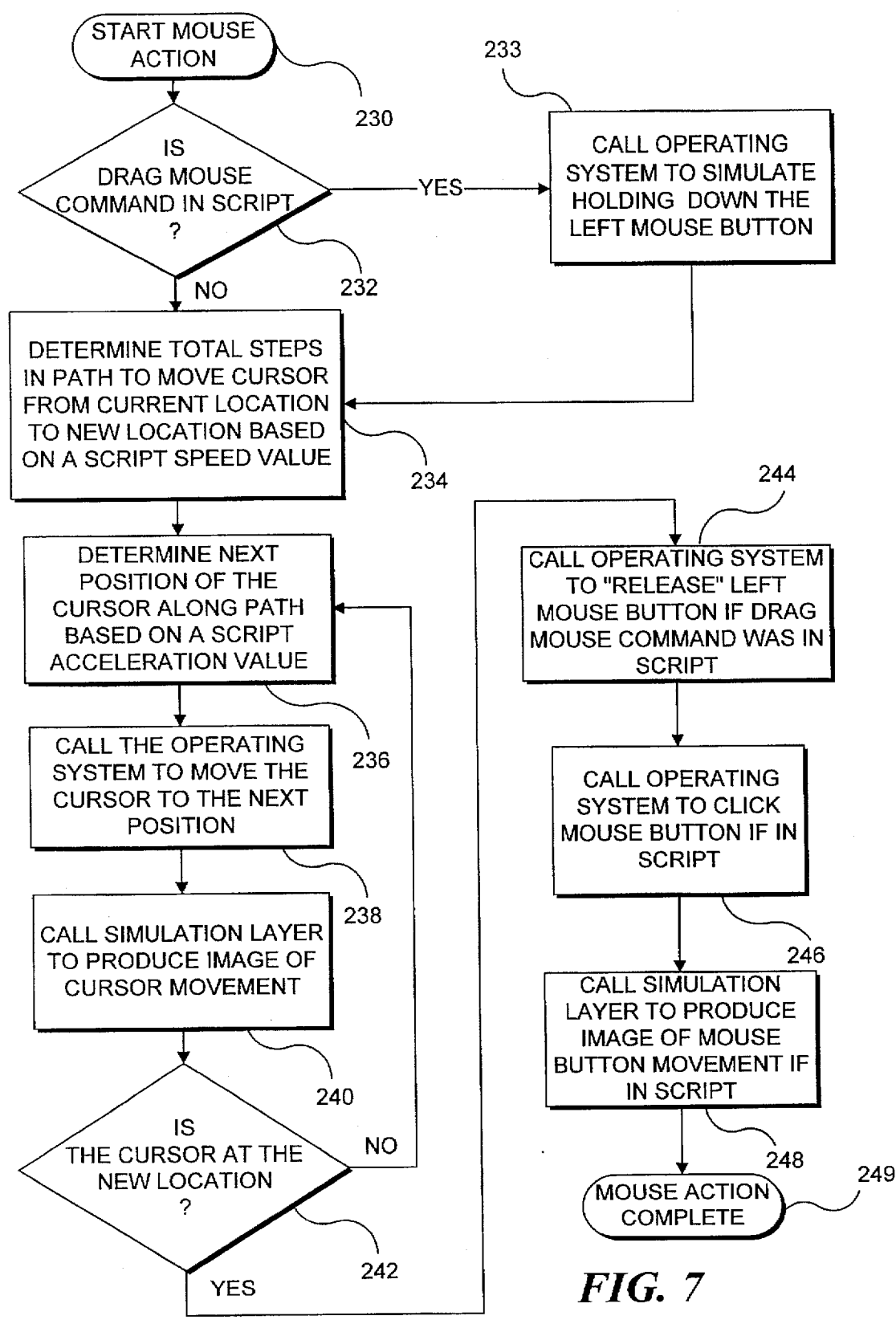
FIG. 7 is a flow chart that defines the logical steps implemented in simulating a mouse action.

The mouse layer receives commands directly from the dialog layer, menu layer, and the scripting engine. Referring now to FIG. 7, in a start block 230, the mouse layer receives a mouse action command. In a decision block 232, the mouse layer determines whether the action is a drag mouse command from the script. If the action is a drag mouse command, then the mouse layer in a logic block 233 passes a command to the operating system to simulate a user holding down the left (select) button of the mouse. Once this command is passed, the mouse layer logic flow is returned to a logic block 234. However, if the mouse action command was not a drag mouse command, then by default, it must have been a move mouse command, and the mouse layer control also passes to logic block 234. No matter the path followed to arrive there, at logic block 234, the mouse layer determines the total steps in a path from a current location of the cursor to a new location. The total number of steps is determined as a function of a speed value that is defined by the script and as a function of the distance to be traveled by the cursor. The greater the speed value, the fewer the steps or images that must be recorded and conversely, a lesser speed value translates into more steps. (Note: in the preferred embodiment, the default speed value is 20; a speed setting of 10 would require 40 steps or images to be recorded to show the cursor moving incrementally from the top left to the bottom right of the display screen.) After the total number of steps are determined, in a logic block 236, the mouse layer determines the next position of the cursor as it traverses the path from its current location to the new location. The velocity at which the cursor moves to the next position is determined as a function of an acceleration value set by a script command and as a function of the distance to be traveled by the cursor. The acceleration value determines the extent to which non-linear movement will be simulated as the cursor traverses its path to a new location. The greater the acceleration value, the faster the cursor will move in the first half of the path from its current location and the slower the cursor will move as it traverses the second half of its path to the new location, and conversely, the lower the acceleration value, the more constant the cursor velocity will be as the cursor moves from its current position to a new position. (Note: the range of values is from 1, i.e., no acceleration or linear velocity, to 2, i.e., maximum acceleration, and the default value is 1.5.) The purpose of the acceleration applied to the movement of the cursor is to more realistically simulate the movement of the cursor as if it were actually being controlled by a mouse/pointing device that is manipulated by an expert. Upon completion of the determination of the next cursor image position, the mouse layer procedure passes to a logic block 238, wherein the mouse layer passes a command to the operating system to move the cursor to the next position. Next, in a logic block 240, the mouse layer passes a command to the simulation layer to produce an image of the cursor's new position, for use in the animation that will show the cursor moving between its starting and end positions.

At this juncture in the logic, the mouse layer in a decision block 242 checks to see if the mouse has reached the new location, and if not, returns to logic block 236 to determine the next position of the mouse, move the cursor incrementally, and produce an image of the cursor in the new position for use in creating the cursor movement animation. This sequence is repeated until the mouse has reached its new location (i.e., the end of the path). Once the mouse has reached its new location at the end of the movement path in a logic block 244, the mouse layer calls the operating system to release the left mouse button if the original mouse action was a drag mouse command. However, if the original mouse action was a move mouse command, the mouse layer logic in a block 246 will call the operating system to click the mouse button, as provided by the script command. Additionally, a click mouse button action that is included in the script is performed at this point in the logic. After the mouse button commands are passed to the operating system, in a logic block 248 the mouse layer passes a command to the simulation layer to produce images of the button being depressed for use in the mouse animation. The mouse action is now complete and in a logic block 249, control is returned to the script engine. It should be noted that the mouse layer calls the simulation layer to produce all simulations of mouse animation commands, even though the commands may originate in the script engine, menu layer, and the dialog layer.

Figure 8:
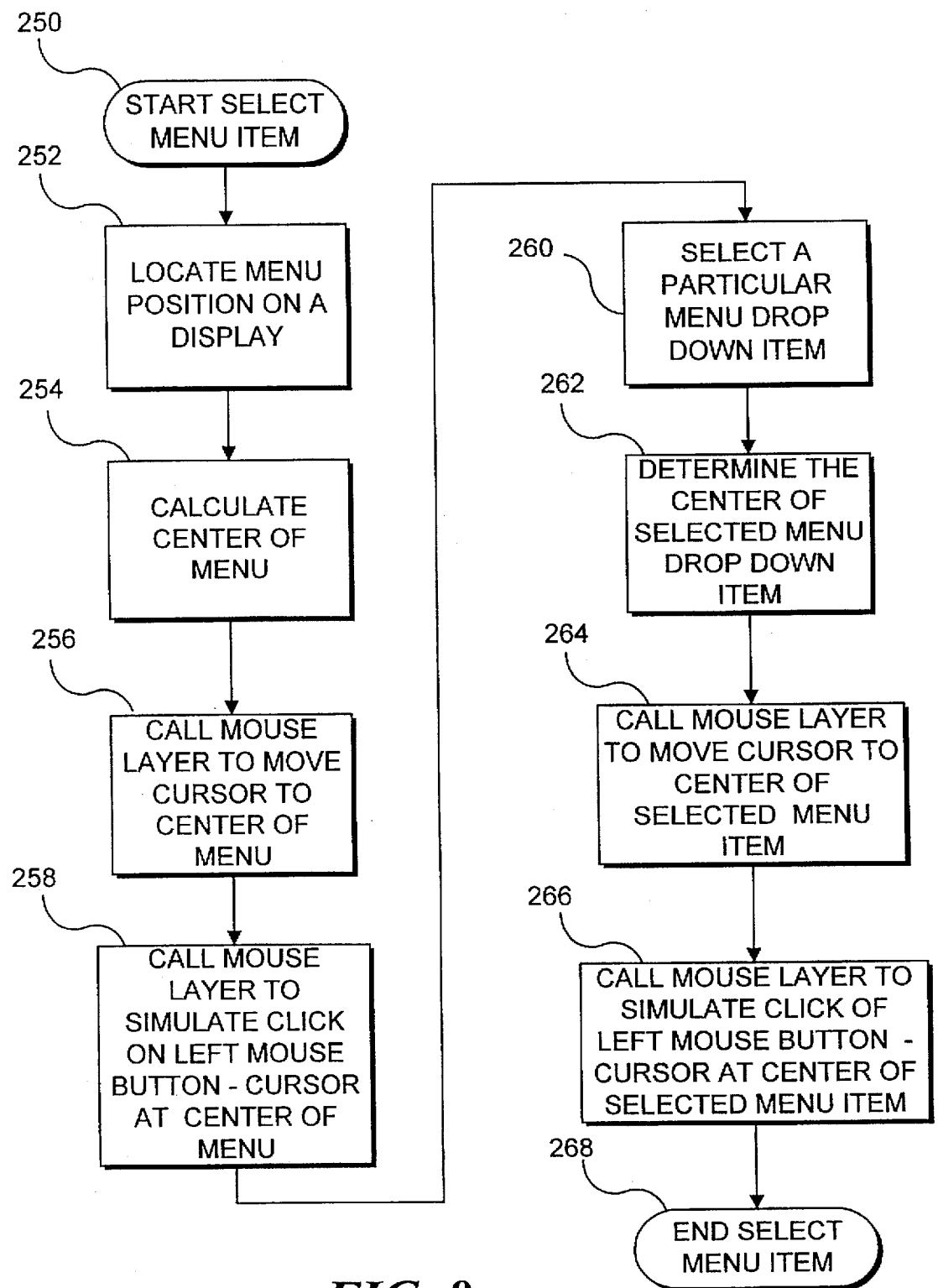
FIG. 8 is a flow chart that defines the logical steps implemented in simulating a select menu action.

The menu layer has at least two commands; one is the selection of a menu item, and the other is the dragging of a menu item. Referring to FIG. 8, the logic for the select menu item action is described first. In a start block 250, the menu layer is passed a select menu item command by the script engine. In a logic block 252, the menu layer locates the menu position on the display screen, and in a logic block 254, the menu layer determines the center of the menu item determined by the author's script command. Once the center of the menu item is determined, the menu layer in a logic block 256 calls the mouse layer to move the cursor to the center of the menu item. Next, the menu layer in a logic block 258 calls the mouse layer to simulate a user clicking the left mouse button while the cursor is at the center of the menu item. The clicking on the menu with the cursor centered over the item of interest causes the menu option list to drop down and display a list of available menu items in the software program in which a procedure is being simulated. In a logic block 260, the menu layer selects a particular menu item from the drop down list, and in a logic block 262, determines the center of the selected menu item in the list. Once the center is determined, in a logic block 264 the menu layer passes a command to the mouse layer to move the cursor from its current location to the center of the selected menu item. After the mouse layer has positioned the cursor in this manner, in a block 266, the menu layer passes another command to the mouse layer to simulate a user clicking the left mouse button with the cursor position at the center of the selected menu item.

Upon completion of the mouse/pointing device button click, the dialog layer logically advances to a logic block 268 and closes the menu layer. The select menu item action is then complete and control passes back to the script engine.

Figure 9:
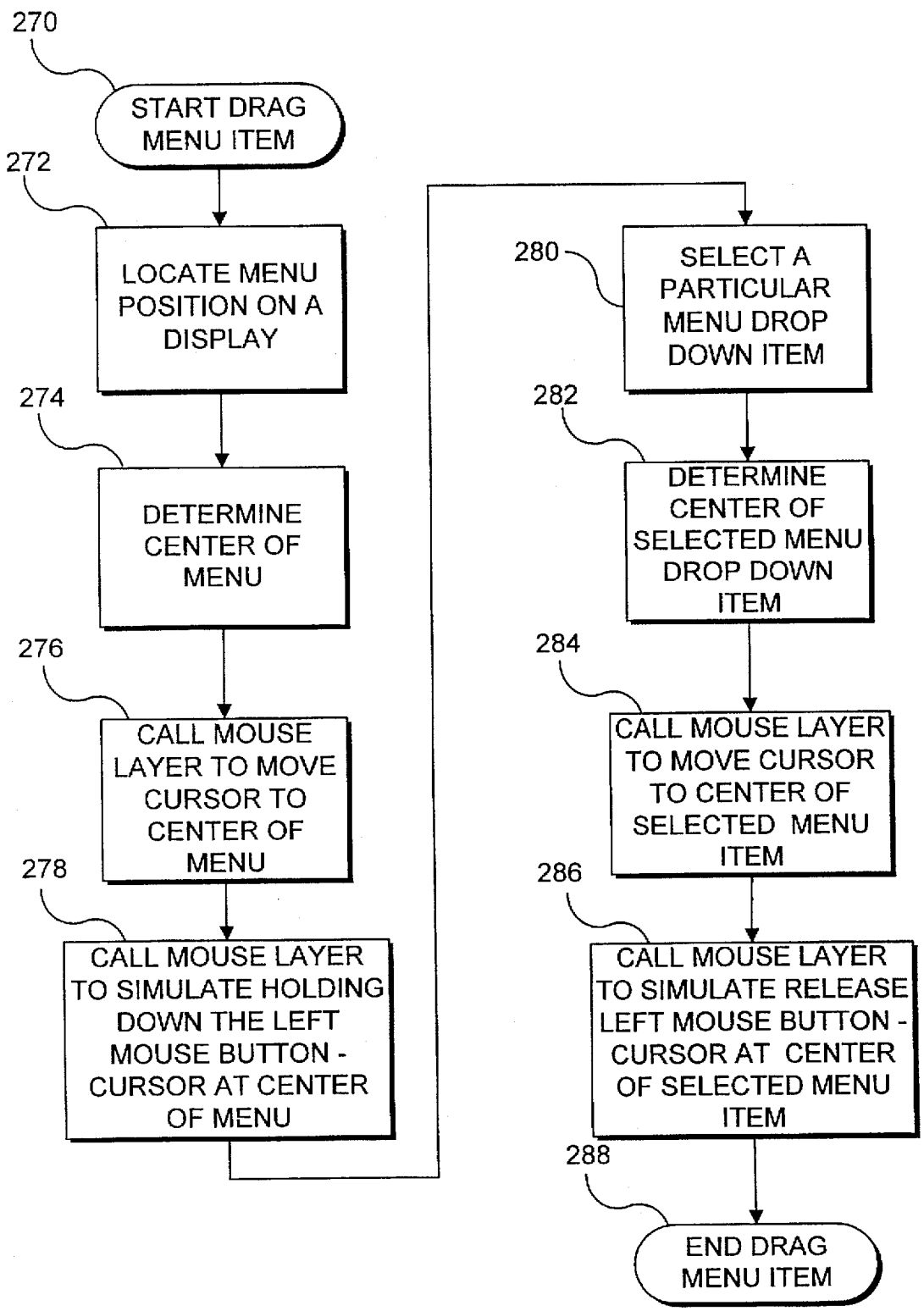
FIG. 9 is a flow chart that defines the logical steps implemented in simulating a drag menu action.

Referring to FIG. 9, the logical steps of a drag menu item action are similar to those of the select menu item action. In a start block 270, the menu layer is passed a "drag menu item" command by the script engine. Subsequently, in a logic block 272, the menu layer locates the menu position on the display screen and in a logic block 274, the menu layer determines the center of one of the items in the menu options. Once the center of this item is determined, the menu layer in a logic block 276 calls the mouse layer to move the cursor to the center of the menu item called for by the author's script command. Next, in a logic block 278, the menu layer calls the mouse layer to simulate a user holding down the left mouse (select) button at the center of the menu item. This action causes the menu list under the selected item to drop down and display a drop down list of menu items. In a logic block 280, the menu layer selects a particular scripted menu item in response to the author's command in the script, and in a logic block 282, determines the center of the selected menu item in the drop down list. Once the center of this item in the drop down list is determined, in a logic block 284, the menu layer passes a command to the mouse layer to move the cursor from its current location to the center of the selected menu item. After the mouse layer has dragged the cursor to the desired position, in a block 286, the menu layer passes another command to the mouse layer to simulate the user releasing the left mouse (select) button with the cursor positioned at the center of the selected menu item. Upon completion of the release, the dialog layer advances to a logic block 288 and closes the menu layer. The drag menu item action having been completed, control passes back to the script engine.

The following sample script of commands that create a simulation demonstrating a procedure for charting a range of data in the Spreadsheet module of Microsoft Corporation's Works™ should help to illustrate the power and simplicity of the present invention. In this script, comments are set off by single quotes from the commands used to create the simulation.

'Set initial conditions for simulation, including mouse/cursor movement speed (in pixels 'per second) and acceleration, and base file name in which DIB images will be stored SetMouseSpeed 20 SetMouseAccel 1.5 InitializeScript vszPath, "Chart"

'Start Microsoft Works™, maximize it, and load Works document into memory StartWorks "c:\wks5\docs\SALES.WKS"

'Set first area (in pixels) of the screen display in Works to "film" (i.e., create DIB images) 'as the rectangular area from (390,38) to (630, 218) SetSnapSize 240, 180 SetSnapPos 390, 38

'Set initial cursor position (in pixels) on the display screen, as simulation begins & store 'images automatically MoveMouseTo 457, 153 SetAutoSnapShot True 'Move cursor to beginning of the range of spreadsheet that will be selected MoveMouseTo 424, 125

'Drag the Mouse so that the cursor goes to (514, 177) to select the range in spreadsheet 'that will be charted DragMouseTo 514, 177

'Press Chart toolbar button using cursor and Mouse select button to open Charting Dialog ClickMouseAt 579, 49

'Set second area to "film"—marked as a localizable size so that if simulation is translated 'to a new version, the exact coordinates may be set to different values by associating 'different values with tokens "XOfEditArea" and "YOfEditArea"SetSnapPos Translatable (48, "XOfEditArea"), Translatable(84, "YOfEditArea")

'Cause drop-down list box for menu item tmc-NewCHType to drop down ClickSdmDlgDDList tmc-NewCHType 'Scroll down once to change the chart type to Line ClickSdmDlgDDListDown tmcNewCHType 'Select the Chart Title edit item from drop down list box ClickSdmDlgEdit tmcNewCHTitle 'Set the title of chart to "Annual Sales" and mark as translatable so that translator can 'associate different language text with title SendText Translatable("Annual Sales", "ChartTitle")

'Click option box for Add border ClickSdmDlgCheck tmcNewCHBorder

'Click OK button in Chart dialog, closing the dialog ClickSdmDlgButton tmcOK

'Wait three seconds for screen to repaint Wait 3

'Final scene image Snapshot

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A system for producing a simulation illustrating a procedure in a software program using a computer, comprising:
   (a) a display on which images are displayed;
   (b) a memory for storing machine instructions comprising the software program and used for effecting production of the simulation, and for storing a script comprising a plurality of commands that define actions to be implemented during the simulation; and
   (c) a central processor for executing the machine instructions, said machine instructions, when executed by the central processor, causing the central processor to:
      (i) execute the software program;
      (ii) execute the commands of the script to effect the plurality of actions defined by the script within the software program; and
      (iii) capture and store a plurality of images in the memory, said images showing the actions that are implemented within the software program in accord with the commands of the script.

2. The system of claim 1, wherein the central processor responds to the machine instructions to convert the images into an animation format that displays the plurality of images on the display sequentially during playback at a rate sufficiently fast so that the actions depicted in the images appear continuous.

3. The system of claim 2, wherein the captured images are selectively converted into one of a plurality of different animation file formats.

4. The system of claim 1, wherein the commands of the script cause the central processor to:
   (a) selectively copy a first natural language text used in the simulation, to a translation file; and
   (b) replace the first natural language text in the simulation with a second natural language text to recreate the simulation with the second natural language text, said second natural language text having been associated with the copied first natural language text in the translation file.

5. The system of claim 4, wherein the first natural language text and the second natural language text are selected from the group consisting of: English, German, French, French Canadian, Dutch, Danish, Spanish, Italian, Norwegian, Swedish, Finnish, Portuguese, Czech, Hungarian, Russian, Polish, Japanese, Korean, and Chinese.

6. The system of claim 1, wherein the processor responds to changes in the script to produce a correspondingly changed simulation.

7. The system of claim 1, where in the commands of the script cause the central processor to capture and store images in the memory that sequentially show a simulation of user controlled actions with an input device, the input device comprising at least one of a pointing device, a keyboard, and an alternate input device, and said simulation of user controlled actions including selecting an item in a display screen produced by execution of the software program.

8. The system of claim 1, wherein the simulation includes at least one of a graphic image, a video, and a previously produced simulation.

9. A method for automatically producing a simulation illustrating a procedure in a software program using a computer, comprising the steps of:

(a) creating a script of commands, said commands indicating a plurality of actions to be implemented by the computer in producing the simulation; and (b) controlling the software program in accord with the commands in the script to produce a plurality of images, said plurality of images sequentially showing the actions comprising the simulation being implemented within the software program as it is executed by the computer, said plurality of images thereby visually simulating the procedure.

10. The method of claim 9, further comprising the step of creating an animation in which the plurality of images are displayed sequentially during playback at a rate sufficiently fast so that the actions shown in the images appear substantially continuous.

11. The method of claim 9, further comprising the step of controlling an operating system running on the computer in accord with the commands in the script to simulate actions of a user effected with an input device, the input device comprising at least one of a pointing device and a keyboard.

12. The method of claim 9, further comprising the steps of:

(a) copying a first natural language text used in the simulation to a translation file;

(b) associating a second natural language text with the copied first natural language text in the translation file; and (c) replacing the first natural language text in the simulation with the second natural language text for creating the simulation with the second natural language text.

13. The method of claim 12, wherein the natural languages comprising the first natural language text and the second natural language text are selected from the group consisting of: English, German, French, French Canadian, Dutch, Danish, Spanish, Italian, Norwegian, Swedish, Finnish, Portuguese, Czech, Hungarian, Russian, Polish, Japanese, Korean, and Chinese.

14. The method of claim 9, further comprising the step of enabling a simulation creator to modify the simulation by editing commands of the script in a text file.

15. The method of claim 9, further comprising the step of selectively converting the plurality of images into an animation file having one of a plurality of different formats.

16. The method of claim 9, wherein the simulation includes at least one of a graphic image, a video, and a previously produced simulation.

17. An article of manufacture for use with a computer to automatically produce a simulation illustrating a procedure in a software program executed on the computer, comprising:

(a) a nonvolatile memory storage device; and (b) a plurality of machine instructions stored on the nonvolatile memory storage device, said plurality of machine instructions enabling production of the simulation as determined by a simulation creator by causing a central processor on which the plurality of machine instructions are executed to:

(i) execute the software program;

(ii) execute a script that includes a series of commands entered by the simulation creator to effect a plurality of actions within the software program while it is being executed by the computer; and (iii) capture and store a plurality of images, said images showing the actions that are implemented within the software program in accord with the commands entered by the simulation creator, thereby visually simulating the procedure in the software program.

18. The article of manufacture of claim 17, wherein the machine instructions further cause the central processor to create an animation for displaying the plurality of images on a display sequentially during playback at a rate sufficiently fast so that the actions shown in the images appear continuous.

19. The article of manufacture of claim 17, wherein the commands entered by the simulation creator cause the central processor to capture and store images in the memory that sequentially show the simulation of user controlled actions effected with an input device, the input device comprising one of a pointing device and a keyboard, and wherein said user controlled actions include selecting an item in a display screen produced when the software program is executed by the central processor.

20. The article of manufacture of claim 17, wherein the commands entered by the creator further cause the central processor to:

(a) copy a first natural language text that appears in the simulation to a translation (b) replace the first natural language text in the simulation with a second natural language text that has been associated in the translation file with the copied first natural language text.

21. The article of manufacture of claim 20, wherein the natural languages comprising the first natural language text and the second natural language text are selected from the group consisting of: English, German, French, French Canadian, Dutch, Danish, Spanish, Italian, Norwegian, Swedish, Finnish, Portuguese, Czech, Hungarian, Russian, Polish, Japanese, Korean, and Chinese.

22. The article of manufacture of claim 17, wherein the commands entered by the user are saved in a text file that is readily editable by the simulation creator to modify the simulation.

23. The article of manufacture of claim 17, wherein the images are selectively converted into an animation file having one of a plurality of different formats.

24. The article of manufacture of claim 17, wherein the images include at least one of a graphic image, a video, and a previously produced simulation.

25. A method for automatically producing a simulation illustrating a procedure that can be implemented in a software program, using a computer, comprising the steps of:

(a) creating a script of commands, said commands indicating a plurality of actions to be implemented by the computer in producing the simulation;

(b) controlling an operating system and the software program in accord with the commands in the script to produce and capture a plurality of images, said plurality of images sequentially showing the actions of the simulation being implemented within the software program, including the simulated actions of input devices being implemented within the operating system;

(c) creating an animation for displaying the plurality of images sequentially at a rate sufficiently fast so that the actions shown in the images appear continuous, said animation thereby visually simulating the procedure in the software program; and (d) automatically replacing a first natural language text used in the simulation with a second natural language text to produce a second simulation in a second natural language.

26. The method of claim 25, further comprising the steps of:

(a) copying the first natural language text in the simulation to a translation file;

(b) associating the second natural language text with the first natural language text that was copied to the translation file; and (c) replacing the first natural language text in the simulation with the second natural language text that has been associated with the first natural language text.

27. The method of claim 25, wherein the natural languages comprising the first natural language text and the second natural language text are a pair of: English, German, French, French Canadian, Dutch, Danish, Spanish, Italian, Norwegian, Swedish, Finnish, Portuguese, Czech, Hungarian, Russian, Polish, Japanese, Korean, and Chinese.

28. The method of claim 25, further comprising the step of saving the commands comprising the script in an editable text file.

29. The method of claim 25, further comprising the step of saving the plurality of images that were captured in an animation file format.

30. The method of claim 25, wherein the plurality of images comprise bit maps and include at least one of a graphic image, a video, and a previously produced simulation.

31. A system for producing a simulation illustrating a procedure in a software program, using a computer, comprising:

(a) a display on which images are displayed;

(b) a memory for storing machine instructions comprising the software program and machine instructions for effecting production of the simulation, and for storing a plurality of commands that define actions to be implemented to produce the simulation; and (c) a central processor for executing the machine instructions, said machine instructions, when executed by the central processor, causing the central processor to:

(i) execute the software program;

(ii) execute the commands to effect a plurality of actions within the software program and operating system;

(iii) store a plurality of images generated within the software program that is displayed on the display in response to the commands;

(iv) simulate use of an input device by a user;

(v) enable selective conversion of the simulation from a first language text into a simulation that uses a second language text; and (vi) create an animation using the plurality of images, said animation visually simulating the procedure in the software program.

32. The system of claim 31, wherein the input device comprises one of a pointing device and a keyboard said simulated use of the input device including selecting an item that is displayed on the display.

33. The system of claim 31, wherein the machine instructions cause the simulation in the first natural language text to be converted to the second natural language text by:

(a) copying the first natural language text in the simulation to a translation file;

(b) enabling a simulation creator to associate the second natural language text with the first language natural text that was copied to the translation file; and (c) automatically replacing the first natural language text in the simulation with the second natural language text that has been associated with the first natural language text in the translation file, producing the simulation in the second natural language text.

34. The system of claim 31, wherein the animation is selectively created in one of a plurality of different animation file formats.

35. The system of claim 31, wherein the commands are a script that is saved in a text file that is readily edited by a simulation creator to modify the simulation.

36. The system of claim 31, wherein languages in which the first natural language text and the second natural text are written are selected from the group consisting of: English, German, French, French Canadian, Dutch, Danish, Spanish, Italian, Norwegian, Swedish, Finnish, Portuguese, Czech, Hungarian, Russian, Polish, Japanese, Korean, and Chinese.

37. The system of claim 31, wherein the plurality of images comprise bit maps and include at least one of a graphic image, a video, and a previously produced simulation.

* * * * *

UNITED STATES PATENT AND TRADEMARK OFFICE
CERTIFICATE OF CORRECTION

PATENT NO. : 5,745,738

DATED : April 28, 1998

INVENTOR(S) : D.A. Ricard

It is certified that error appears in the above-indentified patent and that said Letters Patent is hereby corrected as shown below:

Column 5, line 56     "block 1 10" should read --block 110--

Column 14, line 20     after "translation" insert --file; and--
(Claim 20, line 5)

Signed and Sealed this

Fifteenth Day of September, 1998

Attest:

BRUCE LEHMAN

Attesting Officer     Commissioner of Patents and Trademarks